(12) United States Patent
Shiota et al.

(10) Patent No.: US 9,327,405 B2
(45) Date of Patent: May 3, 2016

(54) ROBOT APPARATUS

(71) Applicant: KABUSHIKI KAISHA YASKAWA DENKI, Kitakyushu-shi (JP)

(72) Inventors: Akihiro Shiota, Kitakyushu (JP); Ken Okawa, Kitakyushu (JP); Toshiaki Ikeda, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 0 days.

(21) Appl. No.: 14/183,526

(22) Filed: Feb. 19, 2014

(65) Prior Publication Data

US 2014/0277732 A1 Sep. 18, 2014

(30) Foreign Application Priority Data

Mar. 14, 2013 (JP) ................. 2013-051636

(51) Int. Cl.
*B25J 9/16* (2006.01)

(52) U.S. Cl.
CPC .............. *B25J 9/1697* (2013.01); *B25J 9/1669* (2013.01); *G05B 2219/39391* (2013.01); *G05B 2219/39568* (2013.01); *G05B 2219/40087* (2013.01)

(58) Field of Classification Search
CPC ............... Y10S 901/00; Y10S 901/02; Y10S 901/09–901/11; Y10S 901/14; Y10S 901/30–901/31; Y10S 901/33; Y10S 901/44; Y10S 901/46–901/47; Y10S 901/50; B25J 9/1684–9/1687; B25J 9/0096; B25J 9/02; B25J 9/10–9/1015; B25J 9/16; B25J 9/1612; B25J 9/1633; B25J 9/1646; B25J 9/1651; B25J 9/1664–9/1669; B25J 9/1694–9/1697; B25J 11/00; B25J 13/00; B25J 13/02–13/025; B25J 13/08–13/085; B25J 13/088–13/089; B25J 15/00–15/0004; B25J 15/009; B25J 19/02–19/021; B25J 19/023; B25J 19/04; B25J 19/063; G01L 5/0061; G01L 5/0076; G01L 5/009; G01L 5/108; G01L 5/226; G05B 19/195; G05B 19/401–19/404; G05B 2219/45063; G05B 2219/45083; G05B 2219/45097; G05B 2219/45101; G05B 2219/39021; G05B 2219/39084; G05B 2219/39108; G05B 2219/39123; G05B 2219/39218; G05B 2219/39469; G05B 2219/39507; G05B 2219/39571; A61B 19/2203; A61B 19/2211; A61B 17/062–17/0625; B23Q 3/064
See application file for complete search history.

(56) References Cited

U.S. PATENT DOCUMENTS

| | | | | |
|---|---|---|---|---|
| 3,904,234 | A * | 9/1975 | Hill et al. | 294/106 |
| 4,607,430 | A * | 8/1986 | Young | 29/868 |
| 4,752,682 | A * | 6/1988 | Beck et al. | 250/227.11 |
| 5,157,830 | A * | 10/1992 | Koch | 29/857 |
| 6,126,651 | A * | 10/2000 | Mayer | 606/1 |
| 6,540,473 | B2 * | 4/2003 | Inokuchi et al. | 414/800 |
| 6,626,238 | B2 * | 9/2003 | Hooper | 166/66 |
| 6,755,064 | B2 * | 6/2004 | Butscher et al. | 72/21.4 |
| 7,182,133 | B2 * | 2/2007 | Webre et al. | 166/250.01 |
| 7,285,015 | B2 * | 10/2007 | Helbok et al. | 439/606 |
| 7,445,260 | B2 * | 11/2008 | Nihei et al. | 294/106 |
| 7,603,768 | B2 * | 10/2009 | Viviroli | 29/753 |
| 7,669,480 | B2 * | 3/2010 | Maekawa | 73/777 |
| 7,819,183 | B2 * | 10/2010 | Borgstadt | 166/77.51 |
| 8,266,940 | B2 * | 9/2012 | Riemeier et al. | 72/306 |
| 8,861,171 | B2 * | 10/2014 | Prahlad et al. | 361/234 |
| 2004/0266276 | A1 * | 12/2004 | Hariki et al. | 439/894 |
| 2005/0281661 | A1 * | 12/2005 | Kesil et al. | 414/744.5 |
| 2007/0095355 | A1 * | 5/2007 | Oomori et al. | 128/898 |
| 2007/0131416 | A1 * | 6/2007 | Odell et al. | 166/250.1 |
| 2010/0256818 | A1 | 10/2010 | Aoba et al. | |
| 2011/0046643 | A1 * | 2/2011 | Milad et al. | 606/144 |
| 2012/0065779 | A1 * | 3/2012 | Yamaguchi et al. | 700/259 |
| 2013/0186999 | A1 * | 7/2013 | Huber | 244/118.1 |

FOREIGN PATENT DOCUMENTS

| | | |
|---|---|---|
| JP | 01-174209 | 7/1989 |
| JP | 07-046288 B2 | 5/1995 |
| JP | 4650411 B2 | 7/2008 |

OTHER PUBLICATIONS

Robot Handling Flexible Cables.pdf (Yasuo Kitaaki, Rintaro Haraguchi, Koji Shiratsuchi, Yukiyasu Domae, Haruhisa Okuda, Akio Noda, Kazuhiko Sumi, Toshio Fukuda, Shun'ichi Kaneko, Takayuki Matsuno, A robotic assembly system capable of handling flexible cables with connector, Aug. 7-10, 2011, Proceedings of the 2011 IEEE, pagees 893-897).*

Solar-powered robot crawls on aging power lines to inspect the grid _ Homeland Security News Wire_2010.pdf (Solar-powered robot crawls on aging power lines to inspect the grid, Jun. 11, 2010, Homeland Security News Wire, http://www.homelandsecuritynewswire.com/solar-powered-robot-crawls-aging-power-lines-inspect-grid, pp. 1-3).*

Using Robots to Inspect Live Utility Lines—NYTimes_2011.pdf (Ian Austen, To Inspect Live Utility Lines, Send in the Robots, Oct. 25, 2011, NYTimes.com, http://www.nytimes.com/2011/10/26/business/energy-environment/using-robots-to-inspect-live-utility-lines.html?pagewanted=a11&_r=0, pp. 1-4).*

Watch This Robot Crawl on a High-Voltage Power Line—IEEE Spectrum_2011.pdf (Erico Guizzo, Watch This Robot Crawl on a High-Voltage Power Line, Feb. 4, 2011, IEEE Spectrum, http://spectrum.ieee.org/automaton/robotics/industrial-robots/expliner-robot-inspects-high-voltage-lines, pp. 1-2).* tension_merriam.pdf (Tension | Definition of tension by Merriam-Webster, Jul. 8, 2015, http://www.merriam-webster.com/dictionary/tension, pp. 1-4).* tension_dictionary.pdf (Tension | Define Tension at Dictionary.com, Jul. 8, 2015, http://dictionary.reference.com/browse/tension, pp. 1-5).*

Japanese Office Action for corresponding JP Application No. 2013-051636, Sep. 16, 2014.

Extended European Search Report for corresponding EP Application No. 14157424.4-1807, Mar. 12, 2015.

Chinese Office Action for corresponding CN Application No. 201410001433.9, Jun. 1, 2015.

Chinese Office Action for corresponding CN Application No. 201410001433.9, Feb. 15, 2016.

\* cited by examiner

*Primary Examiner* — Bao Long T Nguyen

(74) *Attorney, Agent, or Firm* — Mori & Ward, LLP

(57) ABSTRACT

A robot apparatus that performs the work of attaching a cable includes a gripper that grips the cable having first and second ends, the first end being fixed; an arm main body that guides the second end of the cable being gripped by the gripper to the interior of a guide area; a force sensor that is provided on the arm main body and detects that the gripper has come into contact with the second end of the cable; a camera that captures an image of the guide area when the force sensor detects that the gripper has come into contact with the second end of the cable; and an image processor that detects the posture of the second end of the cable based on the captured image. The robot apparatus performs the work of attaching the cable in accordance with the detected posture of the connector.

18 Claims, 5 Drawing Sheets

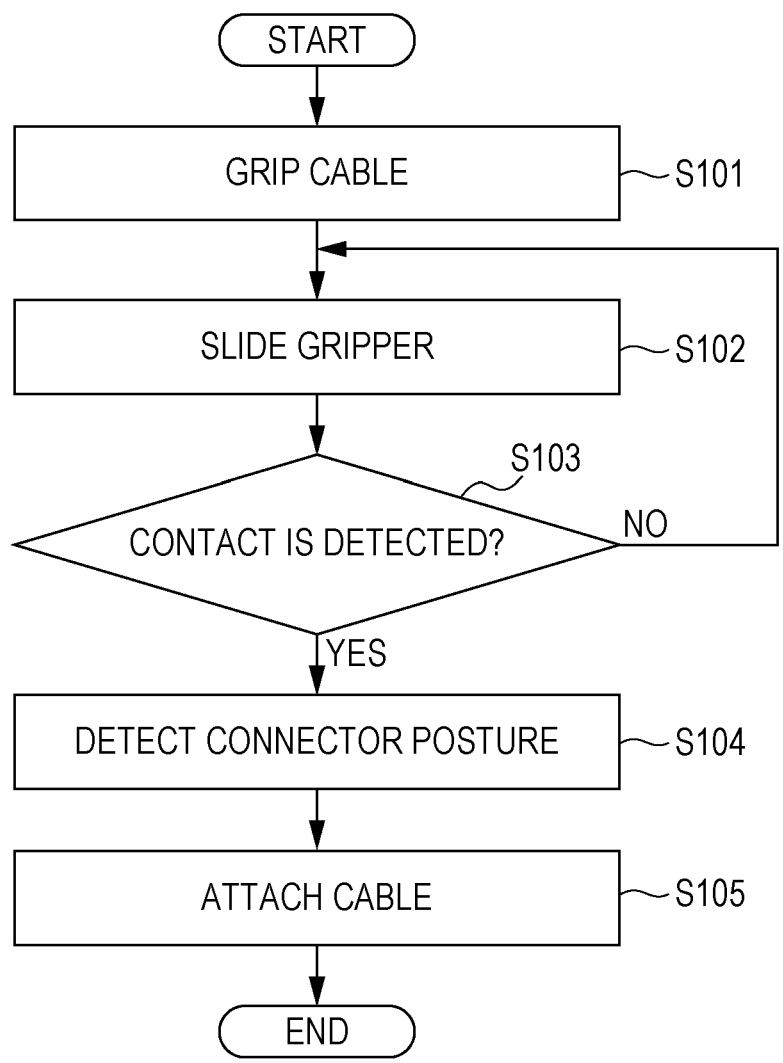

ROBOT APPARATUS

CROSS-REFERENCE TO RELATED APPLICATIONS

The present disclosure contains subject matter related to that disclosed in Japanese Priority Patent Application JP 2013-051636 filed in the Japan Patent Office on Mar. 14, 2013, the entire contents of which are hereby incorporated by reference.

BACKGROUND

1. Field of the Invention

The embodiments disclosed herein relate to a robot apparatus.

2. Description of the Related Art

Recently, the proportion of using robot apparatuses in the various steps of an assembly work has been increasing. For example, Japanese Patent No. 4650411 discloses a robot apparatus that connects the tip of a cable to a connector. The robot apparatus described in Japanese Patent No. 4650411 detects the position of the connector by processing an image captured by a camera and connects the cable to the connector.

Here, in the field of robot apparatuses that perform the work of attaching a linear object, there is a demand for rapidly detecting an end portion of the linear object and efficiently attaching the linear object.

SUMMARY

According to an aspect of the disclosure, there is provided a robot apparatus that performs the work of attaching a linear body and that includes a gripper, an arm main body, a force sensor, a camera, and an image processor. The gripper grips the linear body having a first end and a second end. The first end of the linear body is fixed. The arm main body guides the second end of the linear body to the interior of a certain guide area while the gripper is gripping the linear body. The force sensor is provided on the arm main body and detects that the gripper has come into contact with the second end of the linear body. The camera captures an image of the interior of the guide area in the case where the force sensor detects that the gripper has come into contact with the second end of the linear body. The image processor detects the posture of the second end of the linear body based on the image captured by the camera. The robot apparatus performs the work of attaching the linear body in accordance with the posture of the second end of the linear body, which is detected by the image processor.

BRIEF DESCRIPTION OF THE DRAWINGS

FIG. 5 is a flowchart illustrating the procedure of attaching the connector.

DESCRIPTION OF THE EMBODIMENT

Figure 1:
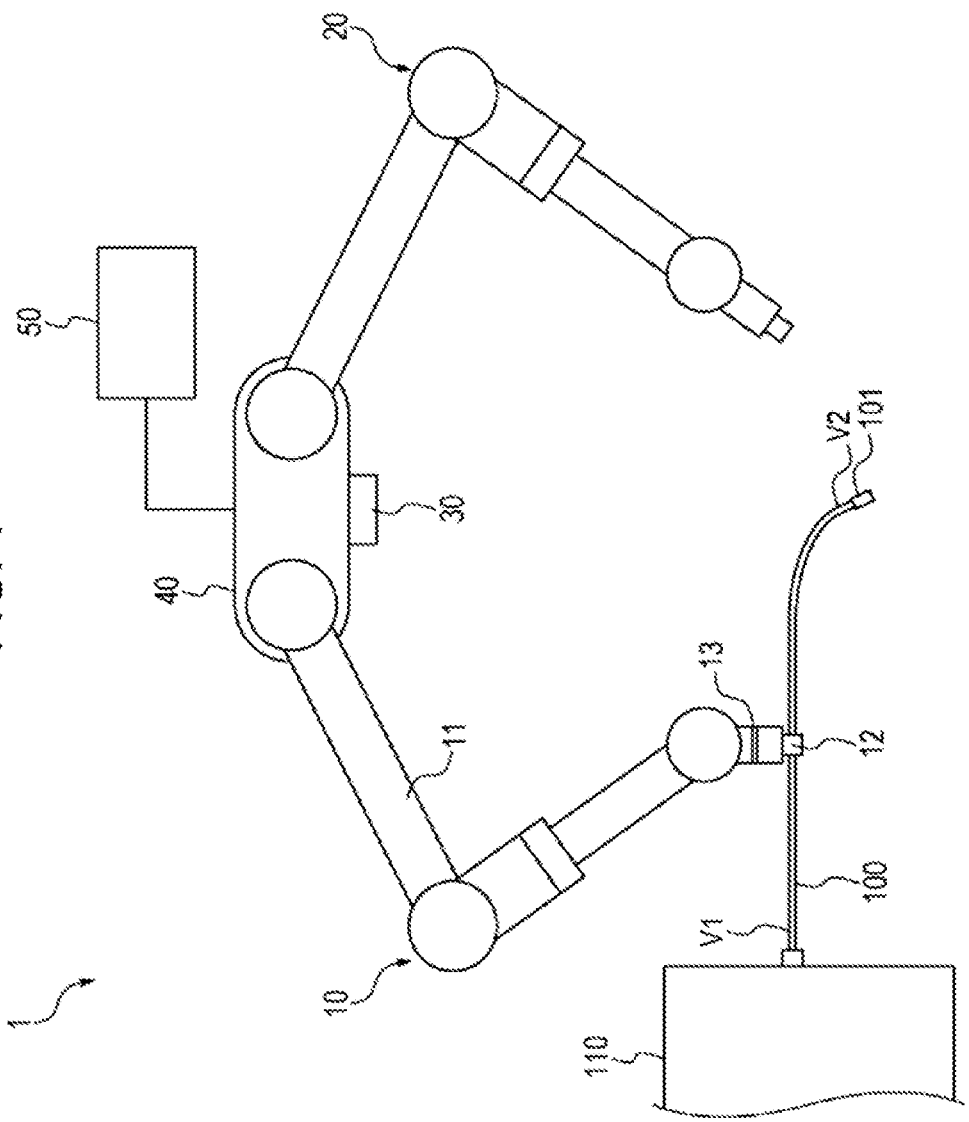
FIG. 1 is a diagram illustrating the schematic configuration of a robot apparatus, viewed from above, according to an embodiment.

Hereinafter, an embodiment will be described with reference to the drawings. In description of the drawings, the same elements are given the same reference numerals, and overlapping descriptions are omitted.

As illustrated in FIG. 1, a robot apparatus 1 is a robot that performs the work of assembling an apparatus 110. In the embodiment, the configuration of attaching, by the robot apparatus 1, a second end of a cable (linear body) 100 whose first end is fixed to a main body of the apparatus 110 will be particularly described. The robot apparatus 1 includes a guide arm 10, a work arm 20, a camera 30, a body 40, and a controller 50.

The guide arm 10 includes an arm main body 11, a gripper 12, and a force sensor 13. The arm main body 11 is an arm with a plurality of joints. A base end portion of the arm main body 11 is connected to the body 40. The gripper 12 is mounted to a tip portion of the arm main body 11. By causing the joints to swing, the arm main body 11 can move the gripper 12, attached to the tip portion of the arm main body 11, to an arbitrary position in the three-dimensional direction. The gripper 12 grips the cable 100.

The force sensor 13 is provided at the tip portion of the arm main body 11, and detects a force applied to the gripper 12. The force sensor 13 detects, of a force applied to the gripper 12, a force in the opposite direction from the sliding direction of the gripper 12 moved by the arm main body 11.

Figure 3:
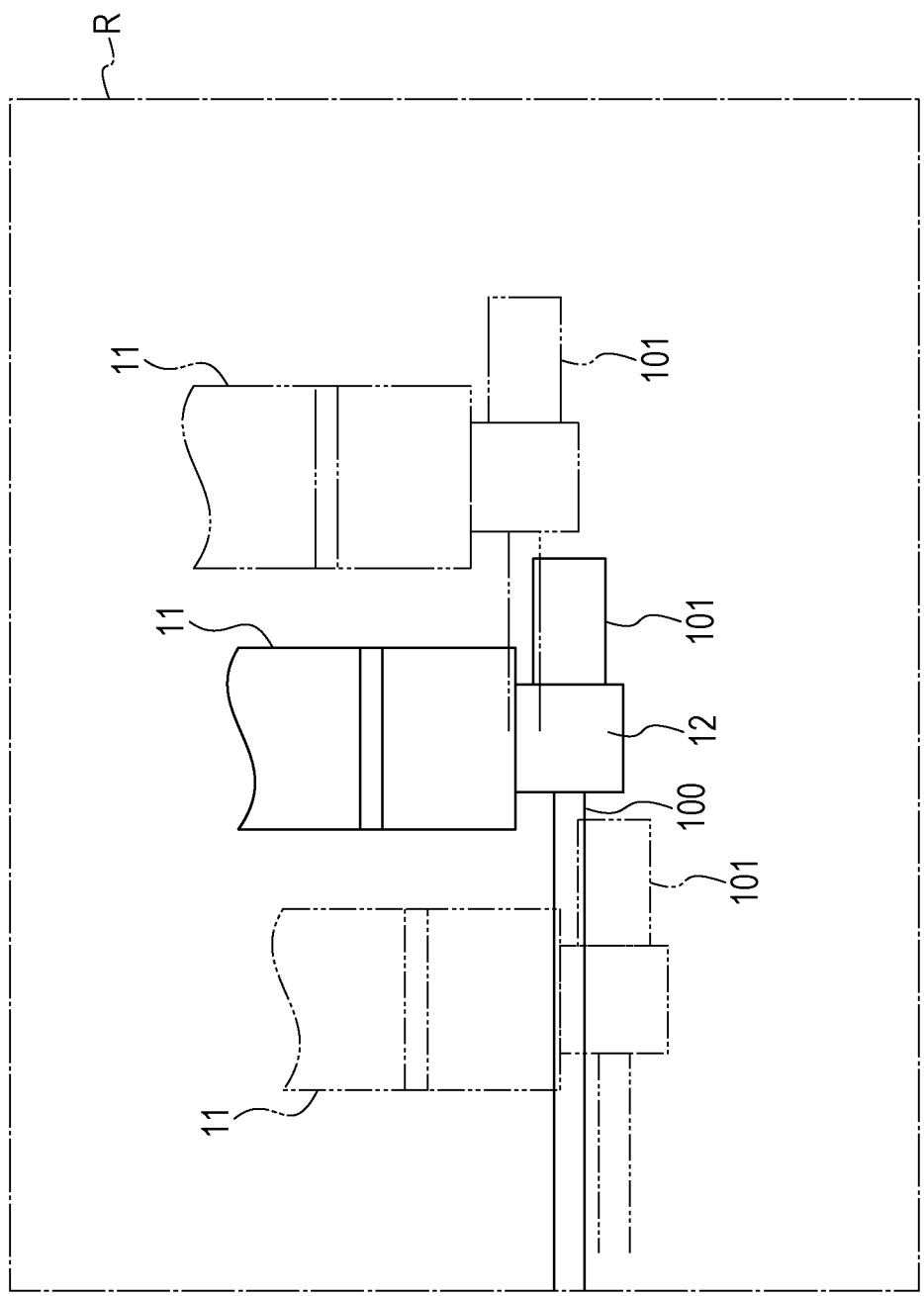
FIG. 3 is a diagram illustrating the positional relationship between a guide area and a connector.

The camera 30 is mounted to the body 40, and captures an image of the interior of a certain guide area R (see FIG. 3). The guide area R will be described in detail later. Although it has been described that the camera 30 is mounted to the body 40, the camera 30 may be mounted to an appropriate position other than the body 40, such as near the tip portion of the arm main body 11.

The work arm 20 grips a connector 101 mounted to the second end of the cable 100. For example, the work arm 20 performs the work of attaching the second end of the cable 100, such as connecting the second end of the cable 100 to a certain position on the apparatus 110.

The body 40 supports a base end portion of the guide arm 10 and a base end portion of the work arm 20 to be capable of swinging.

Figure 2:
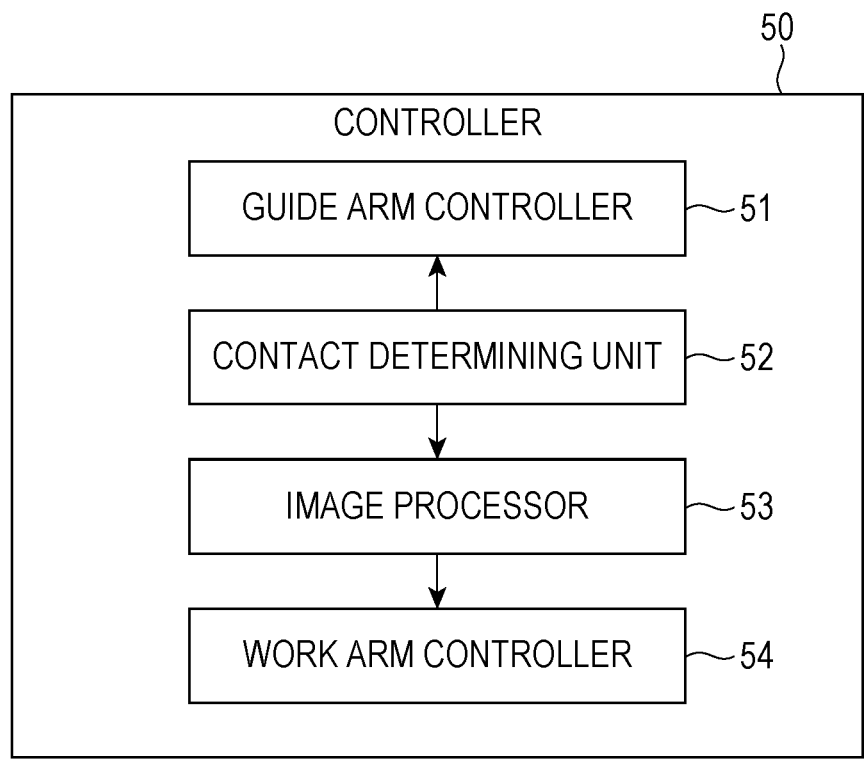
FIG. 2 is a functional block diagram illustrating the details of a controller illustrated in FIG. 1.

The controller 50 controls the driving of the guide arm 10 and the work arm 20. Specifically, by using the guide arm 10 and the camera 30, the controller 50 detects the connector 101 mounted to the second end of the cable 100. By using the work arm 20, the controller 50 performs an attaching work, such as connecting the connector 101 to a certain position on the apparatus 110. Functionally, as illustrated in FIG. 2, the controller 50 includes a guide arm controller 51, a contact determining unit 52, an image processor 53, and a work arm controller 54. The controller 50 is physically configured of a computer system including a central processing unit (CPU), memory, and the like.

The guide arm controller 51 controls the driving of the guide arm 10. Specifically, the guide arm controller 51 controls the arm main body 11 and the gripper 12 to grip a portion near the first end of the cable 100 (a portion near the end portion connected to the apparatus 110). The position of the cable 100 gripped by the gripper 12 is estimatable by detecting in advance the position at which the cable 100 is fixed to the apparatus 110. The position of the second end of the cable 100 differs from one cable 100 to another due to the habit of the cable 100 or the like and is thus difficult to be accurately estimated.

The guide arm controller 51 controls the arm main body 11 and the gripper 12, slides the gripper 12 in a certain path toward the second end of the cable 100 while the gripper 12 is gripping the cable 100, and guides the second end of the cable 100 (connector 101) to the interior of the certain guide area R.

Here, the guide area R will be described. The length of the cable 100 is determined in advance by a specification, design, or the like. When the gripper 12, which is gripping the cable 100, is slid in a certain path to the second end of the cable 100, the second end of the cable 100 is positioned in a certain area. In the embodiment, as illustrated in FIG. 3, the area including the position of the second end of the cable 100 in the case where the gripper 12 is slid in a certain path is referred to as the guide area R.

Note that the length of the cable 100 may vary depending on tolerances or the like. If the length of the cable 100 varies from one to another, the position of the second end of the cable 100 in the case where the gripper 12 is slid in a certain path also varies. The guide area R is set in advance to include the positions of the second ends of these cables 100 with different lengths, if any.

In addition, in the case where the guide arm controller 51 slides the gripper 12 in a certain path, the guide arm controller 51 controls the arm main body 11 to decrease the sliding speed of the gripper 12 near the second end of the cable 100 where the connector 101 is provided. For example, the guide arm controller 51 controls the arm main body 11 to decrease the sliding speed of the gripper 12, sliding speed V2, to be slower at the second end than the sliding speed V1 at the first end of the cable 100 by gradually decreasing the sliding speed as the gripper 12 approaches the second end of the cable 100, or by decreasing the speed of the gripper 12 to a certain speed when the gripper 12 becomes close to the second end of the cable 100 to a certain degree.

When the guide arm controller 51 is notified by the contact determining unit 52 of the fact that the gripper 12 has been slid to the second end of the cable 100, the guide arm controller 51 stops sliding the gripper 12.

Figure 4:
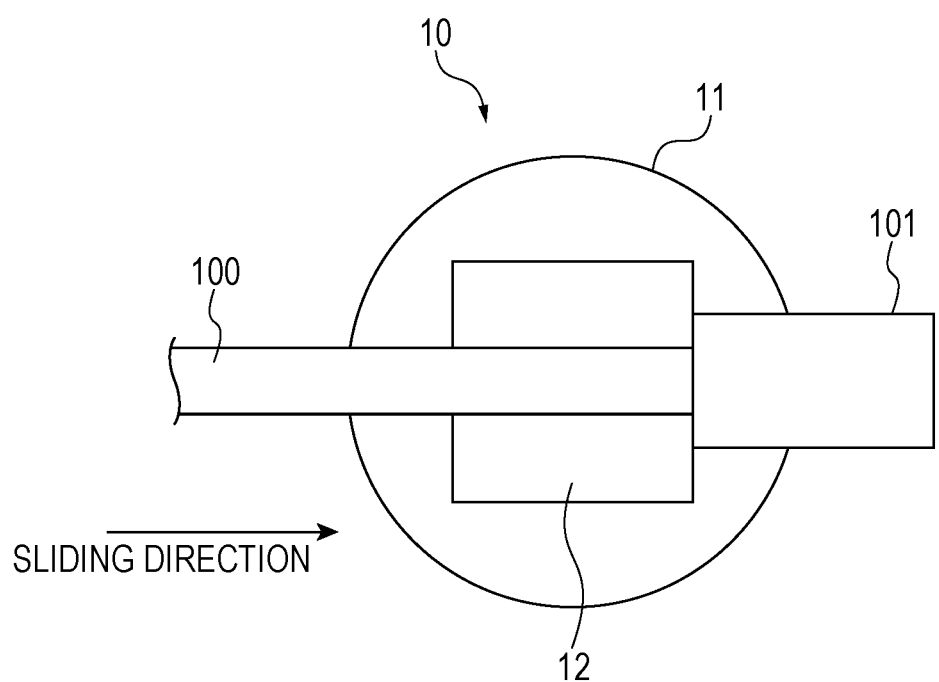
FIG. 4 is a diagram illustrating a state in which a gripper and the connector are in contact with each other.

On the basis of a force applied to the gripper 12, detected by the force sensor 13, the contact determining unit 52 determines whether the gripper 12 has been slid to the second end of the cable 100. The connector 101 is provided at the second end of the cable 100. Thus, as illustrated in FIG. 4, when the gripper 12 is slid toward the second end of the cable 100 while gripping the cable 100, the gripper 12 comes into contact with the connector 101.

In response to this contact, a great force in the opposite direction from the sliding direction of the gripper 12 is applied to the gripper 12. In response to detection by the force sensor 13 of application of a great force in the opposite direction from the sliding direction to the gripper 12, the contact determining unit 52 determines that the gripper 12 has come into contact with the connector 101, that is, the gripper 12 has been slid to the second end of the cable 100.

When the contact determining unit 52 determines that the gripper 12 has been slid to the second end of the cable 100, the contact determining unit 52 notifies the guide arm controller 51 and the image processor 53 of the fact that the gripper 12 has been slid to the second end of the cable 100.

When the image processor 53 is notified by the contact determining unit 52 of the fact that the gripper 12 has been slid to the second end of the cable 100, the image processor 53 detects the posture of the connector 101 on the basis of an image including the guide area R, which is captured by the camera 30. Existing image processing technology can be used in this detection of the posture of the connector 101. Here, the tilt of the connector 101, the rotation state of the connector 101, and the like are detectable.

The work arm controller 54 controls the driving of the work arm 20. Specifically, the work arm controller 54 controls the work arm 20 to grip the connector 101 on the basis of the posture of the connector 101, detected by the image processor 53. The work arm controller 54 controls the work arm 20 to perform an attaching work, such as connecting the connector 101 to a certain position on the apparatus 110.

Next, the procedure of the work of attaching the connector 101 provided at the second end of the cable 100 will be described. As illustrated in FIG. 5, the guide arm controller 51 first controls the guide arm 10 such that a portion near the first end of the cable 100 will be gripped by the gripper 12 (step S101). Next, the guide arm controller 51 controls the arm main body 11 to slide the gripper 12 in a certain path toward the second end of the cable 100 while the gripper 12 is gripping the cable 100 (step S102). Accordingly, the second end of the cable 100 (connector 101) is guided to the interior of the guide area R.

Next, on the basis of the detection result obtained by the force sensor 13, the contact determining unit 52 determines whether the gripper 12 has come into contact with the connector 101 (step S103). When it is determined that the gripper 12 is not in contact with the connector 101 (NO in step S103), the guide arm controller 51 performs the above-described processing in step S102. Meanwhile, when it is determined that the gripper 12 has come into contact with the connector 101, that is, the gripper 12 has been slid to the second end of the cable 100 (YES in step S103), the image processor 53 detects the posture of the connector 101 on the basis of an image captured by the camera 30 (step S104).

Next, on the basis of the posture of the connector 101, detected by the image processor 53, the work arm controller 54 controls the work arm 20 to grip the connector 101, and performs the work of attaching the second end of the cable 100 (step S105).

The embodiment is configured as described above. The robot apparatus 1 guides the connector 101 of the cable 100 to the interior of the guide area R by sliding the gripper 12 while the gripper 12 is gripping the cable 100. When the force sensor 13 detects that the gripper 12 has come into contact with the connector 101, the robot apparatus 1 detects the posture of the connector 101 on the basis of an image captured by the camera 30. On the basis of the detected posture of the connector 101, the robot apparatus 1 controls the work arm 20 to grip the connector 101, and performs the work of attaching the second end of the cable 100. In this manner, the connector 101 of the cable 100 can be guided to the interior of the guide area R by sliding the gripper 12, and the posture of the connector 101 becomes easily detectable on the basis of an image of the guide area R.

For example, when the connector 101 is not guided to the guide area R using the gripper 12, because the position of the connector 101 is unknown, it is necessary to perform such processing to capture an image of an area wider than the guide area R and to find the connector 101 on the basis of this image of the wider area. In contrast, in the embodiment, because the posture of the connector 101 is detectable on the basis of an image of the guide area R as has been described above, image processing can be performed in a short time.

Accordingly, the robot apparatus 1 according to the embodiment can efficiently perform the work of attaching the cable 100.

When sliding the gripper 12 in a certain path, the guide arm controller 51 controls the arm main body 11 to decrease the sliding speed of the gripper 12 near the second end of the cable 100 where the connector 101 is provided. Accordingly, when the gripper 12 comes into contact with the connector 101, a force applied to the connector 101 becomes smaller, thereby suppressing the occurrence of failures such as dropping off of the connector 101 from the second end of the cable 100 or breakage of the connector 101.

Since the robot apparatus 1 has the work arm 20, after the posture of the connector 101 has been detected, the robot apparatus 1 can grip the connector 101 with the work arm 20 and quickly perform the work of attaching the cable 100. While the cable 100 is being gripped by the gripper 12 of the guide arm 10, the work arm 20 can grip the connector 101. Thus, the positional displacement of the connector 101 does not occur, and the work arm 20 can easily grip the connector 101. Accordingly, because the robot apparatus 1 includes the guide arm 10 used to detect the position of the connector 101 and the work arm 20 which performs the work of attaching the cable 100, the robot apparatus 1 can more efficiently perform the work of attaching the cable 100.

Using the detection result obtained by the force sensor 13, the fact that the gripper 12 has come into contact with the connector 101, provided at the second end of the cable 100, is detected. Accordingly, by detecting by the force sensor 13 the fact that the gripper 12 has come into contact with the connector 101, the fact that the gripper 12 has slid to the second end of the cable 100 is detectable.

Although the embodiment has been described as above, the embodiment is not limited to the above-described example. For example, it has been described that the fact that the gripper 12 has come into contact with the connector 101, provided at the second end of the cable 100, is detected. Alternatively, other than the connector 101, an appropriate protrusion or the like may be provided at the second end of the cable 100, and the fact that the gripper 12 has been slid to the second end of the cable 100 may be detected. For example, a protrusion or the like may be provided at the second end of the cable 100, and the fact that the gripper 12 has come into contact with this protrusion or the like may be detected.

Although it has been described that the sliding speed of the gripper 12 is decreased near the second end the cable 100, the gripper 12 may be slid at a constant speed, such as in the case where the gripper 12 is slid at a slow speed.

Although it has been described that the work of attaching the second end of the cable 100 is performed using the work arm 20, the work arm 20 may not necessarily be provided. In this case, the work of attaching the cable 100 may be performed by the guide arm 10. For example, after the second end of the cable 100 has been detected, the guide arm 10 may be moved to align the position of the second end of the cable 100 at a certain position, or the cable 100 may be placed at a certain position, and then the gripper 12 of the guide arm 10 may re-grip the connector 101 and locate the second end of the cable 100 at a certain position.

Alternatively, a sensor that detects whether the cable 100 is being gripped by the gripper 12 may be provided. In this case, if the gripper 12 fails in gripping the cable 100, for example, the gripper 12 may quickly re-grip the cable 100.

Although it has been described in the foregoing example that the robot apparatus 1 performs the work of attaching the cable 100, the robot apparatus 1 may perform the work of attaching a linear body (such as a hose) other than the cable 100.

It should be understood by those skilled in the art that various modifications, combinations, sub-combinations and alterations may occur depending on design requirements and other factors insofar as they are within the scope of the appended claims or the equivalents thereof.

What is claimed is:

1. A robot apparatus that performs a work of attaching a linear body, comprising:
   a gripper that grips the linear body having a first end and a second end, the first end being fixed;
   an arm main body that guides the second end of the linear body to interior of a certain guide area while the gripper is gripping the linear body;
   a force sensor that is provided on the arm main body and that detects that the gripper has come into contact with the second end of the linear body;
   a camera that captures an image of the interior of the guide area in a case where the force sensor detects that the gripper has come into contact with the second end of the linear body; and
   a controller including:
       a contact determining unit; and
       an image processor that detects posture of the second end of the linear body based on the image captured by the camera when the image processor is notified that the gripper has come into contact with the second end of the linear body,
   wherein the robot apparatus performs the work of attaching the linear body in accordance with the posture of the second end of the linear body, which is detected by the image processor,
   wherein a connector is provided at the second end of the linear body, and
   wherein the force sensor detects when the gripper has come into contact with the connector prior to performing the work and the contact determining unit provides the notification to the image processor when the force sensor detects that the gripper has come into contact with the connector.

2. The robot apparatus according to claim 1, wherein the arm main body decreases a speed at which the gripper is slid to be slower at the second end of the linear body than the first end of the linear body.

3. The robot apparatus according to claim 1, further comprising a work arm that grips the second end of the linear body based on the posture of the second end of the linear body, which is detected by the image processor, and that performs the work of attaching the linear body.

4. The robot apparatus according to claim 1, wherein the arm main body slides the gripper in a certain path toward the second end of the linear body and guides the second end of the linear body to the interior of the certain guide area.

5. The robot apparatus according to claim 1, wherein the force sensor is disposed at a tip portion of the arm main body between the arm main body and the gripper.

6. The robot apparatus according to claim 1, wherein the gripper is configured to slide along the linear body and the force sensor is configured to detect a force in a direction opposite to a sliding direction of the gripper.

7. The robot apparatus according to claim 1,
   wherein the robot apparatus comprises a first arm and a second arm,
   wherein the arm main body is disposed on the first arm, and
   wherein the second arm performs the work of attaching the linear body in accordance with the posture of the second end of the linear body.

8. A robot apparatus that performs a work of attaching a linear body, comprising:
   gripping means for gripping the linear body having a first end and a second end, the first end being fixed;
   guiding means for guiding the second end of the linear body to interior of a certain guide area while the gripping means is gripping the linear body;
   force sensing means for detecting that the gripping means has come into contact with the second end of the linear body, the force sensing means being provided on the guiding means;

image capturing means for capturing an image of the interior of the guide area in a case where the force sensing means detects that the gripping means has come into contact with the second end of the linear body; and a control means including:

a contact determining means; and image processing means for detecting posture of the second end of the linear body based on the image captured by the image capturing means when the image processing means is notified that the gripping means has come into contact with the second end of the linear body, wherein the robot apparatus performs the work of attaching the linear body in accordance with the posture of the second end of the linear body, which is detected by the image processing means, wherein a connector is provided at the second end of the linear body, and wherein the force sensing means detects when the gripping means has come into contact with the connector prior to performing the work and the contact determining means provides the notification to the image processing means when the force sensing means detects that the gripping means has come into contact with the connector.

9. The robot apparatus according to claim 8, wherein the guiding means decreases a speed at which the gripping means is slid to be slower at the second end of the linear body than the first end of the linear body.

10. The robot apparatus according to claim 8, further comprising attaching means for gripping the second end of the linear body based on the posture of the second end of the linear body, which is detected by the image processing means, and performing the work of attaching the linear body.

11. The robot apparatus according to claim 8, wherein the guiding means slides the gripping means in a certain path toward the second end of the linear body and guides the second end of the linear body to the interior of the certain guide area.

12. The robot apparatus according to claim 8, wherein the force sensing means is disposed at a tip portion of an arm main body between the arm main body and the gripping means.

13. The robot apparatus according to claim 8, wherein the gripping means is configured to slide along the linear body and the force sensing means is configured to detect a force in a direction opposite to a sliding direction of the gripping means.

14. The robot apparatus according to claim 8, wherein the robot apparatus comprises a first arm and a second arm, wherein the gripping means is disposed on the first arm, and wherein the second arm performs the work of attaching the linear body in accordance with the posture of the second end of the linear body.

15. A robot apparatus that performs a work of attaching a linear body, the linear body having a first end and a second end, the first end being fixed and the second end having a connector, the robot apparatus comprising:

a gripper configured to grip the linear body;

an arm main body that is configured to guide the second end of the linear body to an interior of a certain guide area while the gripper is gripping the linear body;

a force sensor that is provided on the arm main body and that is configured to detect that the gripper has come into contact with the second end of the linear body;

a camera that captures an image of the interior of the guide area in a case where the force sensor detects that the gripper has come into contact with the second end of the linear body; and a controller including a contact determining unit; and an image processor configured to detect a posture of the second end of the linear body based on the image captured by the camera when the image processor is notified that the gripper has come into contact with the second end of the linear body, wherein the robot apparatus performs the work of attaching the linear body in accordance with the posture of the second end of the linear body, which is detected by the image processor, and wherein the force sensor is configured to detect when the gripper has come into contact with the connector prior to performing the work and the contact determining unit is configured to provide the notification to the image processor when the force sensor detects that the gripper has come into contact with the connector.

16. The robot apparatus according to claim 15, wherein the force sensor is disposed at a tip portion of the arm main body between the arm main body and the gripper.

17. The robot apparatus according to claim 15, wherein the gripper is configured to slide along the linear body and the force sensor is configured to detect a force in a direction opposite to a sliding direction of the gripper.

18. The robot apparatus according to claim 15, wherein the robot apparatus comprises a first arm and a second arm, wherein the arm main body is disposed on the first arm, and wherein the second arm performs the work of attaching the linear body in accordance with the posture of the second end of the linear body.

\* \* \* \* \*